United States Patent Office 3,288,687
Patented Nov. 29, 1966

3,288,687
PROCESS FOR THE PURIFICATION OF EPSILON-CAPROLACTAM BY DILUTION, ACIDULATION AND DISTILLATION
Willi Zimmerli, Domat, Ems, and Heinz Füeg, Chur, Switzerland, assignors to Inventa A.G. für Forschung und Patentverwertung, Zurich, Switzerland
No Drawing. Filed Nov. 29, 1962, Ser. No. 241,015
Claims priority, application Switzerland, Nov. 30, 1961, 13,948/61
3 Claims. (Cl. 203—35)

The invention relates to a novel process of purifying and refining $\epsilon$-caprolactam and increasing its purity while avoiding hydrolysis.

As is well known, $\epsilon$-caprolactam is obtained by the Beckmann rearrangement of cyclohexane oxime with oleum. The crude $\epsilon$-caprolactam thus obtained contains impurities which must be removed in order to obtain useful polyamides upon polymerization. Even repeated fractionation does not lead to a satisfactorily pure product, however. It had been suggested to treat crude caprolactam, either in solid state or near its boiling point, with an inert gas. Thereby compounds are removed which lower the permanganate stability of the caprolactam, however, slight losses of caprolactam also occur. It has further been suggested to dissolve crude caprolactam in oleum and to heat the solution for a prolonged period of time at 120 to 190° C., followed by neutralization, separation and distillation.

Both the processes named yield comparatively pure caprolactam, but an additional process step, over and above the refining by distillation, is required.

It now has been found that the permanganate stability of lactam and, therefore, its purity can be improved in a satisfactory manner when the water-containing crude lactam is acidulated and is freed from water at a pH of 3.2–4.2 by distillation, followed by rectification or extraction in the conventional manner.

It had previously been suggested to carry out the actual rectification of the lactam with the addition of small quantities of acids or alkalies. However, a part of the caprolactam thereby is hydrolyzed to aminocaproic acid.

It has been established that the crude lactam derived from the Beckmann rearrangement which normally has a pH of substantially 8 and a water content of approximately 30 percent, practically does not undergo any purification when the water is evaporated at that pH-value. Volatile bases, such as e.g., ammonia, are removed by such a process whereby the pH increases to approximately 10–11. The amount of distilling bases can be greatly increased by addition of sodium hydroxide to the crude lactam. These bases distilling off, however, have but a slight influence upon the permanganate stability of the lactam, which is evidenced by the fact that the distillate, obtained with up to 0.12 gram-equivalent volatile bases per liter, shows permanganate values of several thousand.

However, when acid is added to the crude lactam oil, prior to or during the prefining step of distillation, so that a pH of 3.2–4.2 is attained, acid impurities can be removed. These amount merely to approximately 0.002 gram-equivalent of volatile acids per liter distillate. However, these slight amounts consume a large quantity of permanganate. On account of these acids, the permanganate value of the distillate is lowered toward zero, and its pH is 2–4. The lactam oil remaining in the sump or still bottom largely is freed from these impurities which lower the permanganate value, i.e., a 2–4 times higher permanganate value of the crude lactam is attained as compared to a crude not treated with acid.

Especially surprising in carrying out the process according to the invention is the fact that in the pH range of 3.2–4.2, and preferably of 3.5–3.8, practically no hydrolysis of the caprolactam to aminocaproic acid occurs, provided that the dwelling time is limited to not over 30 minutes.

As starting product for the purification according to the invention, the crude lactam obtained from the neutralization following the Beckmann rearrangement and removal of the aqueous layer, is employed. The content of $\epsilon$-caprolactam of this crude is approximately 65 percent by weight. Further present are approximately 1.2 percent by weight ammonium sulfate, approximately 30 percent by weight water and approximately 3.7 percent by weight impurities. The density of the crude at 25° C. is 1.066.

In accordance with the invention, this crude lactam is diluted with water in an approximate proportion of 4 parts water to 10 parts crude lactam. To 10 parts crude lactam substantially 0.25 part normal sulfuric acid also is added whereby a pH of 4.0 is attained. In order to maintain the pH of 4, sulfuric acid is added during the distillation. The latter is carried out, e.g., in four fractions with approximately 1 part each of water. The sulfuric acid thereby is added after distillation of each fraction.

The following Table 1 shows the changes in the pH values of the distilling fractions, of the crude lactam remaining in the sump, and changes in the permanganate values of these products by the distillation. As starting materials serve 500 ml. crude caprolactam, to which 180 ml. water and 11.8 ml. normal surfuric acid had been added.

Table 1

| Distillate—fractions | pH | g.-equiv. acid content | PV[1] | Sump pH before acid addn. | 1 n-H$_2$SO$_4$ | pH after acid addn. |
|---|---|---|---|---|---|---|
| Before Distill | | | | 8.0 | 11.8 | 4.0 |
| 1st (50 ml.) | 2.8 | 0.00025 | 0–30 | 4.4 | 0.5 | 4.0 |
| 2nd (50 ml.) | 4.0 | 0.00005 | 150 | 4.5 | 1.3 | 4.0 |
| 3rd (50 ml.) | 4.6 | 0.00010 | 1,000 | 4.5 | 2.5 | 4.0 |
| 4th (50 ml.) | 8.9 | none | 1,000 | 3.8 | none | 3.8 |
| 5th (500 ml.) | 9.2 | none | 3,600 | 3.6 | none | 3.6 |
| Total Distillate (250 ml.) | | 0.0004 | | | 16.1 | |

[1] PV is the permanganate value, as explained below.

The remaining crude lactam has a pH of 3.6. It is extracted with benzene, and the solvent distilled. After distillation of the benzene the lactam has a permanganate value of approximately 30. When no acid is added during the distillation, the lactam has a permanganate value of 0–5.

The permanganate value is determined as follows: 1 gram of the lactam to be tested is weighed exactly and dissolved in a 250 ml. Erlenmeyer flask in 100 ml. distilled water (cooling to 20° C.). 1 ml. n/100 KMNO$_4$ solution (aqueous) is added to the solution, exactly measured from a pipette. The solution then immediately is transferred into a 100 ml. measuring cylinder and set directly next to a color standard. The discoloration of the sample is observed, and the time is measured with a stop watch at which test sample and blank have exactly the same color. The color standard consists of 3 g. CoCl$_2 \cdot$6H$_2$O plus 2 g. CuSO$_4 \cdot$5H$_2$O in 1 liter water. The time in seconds to attain identical colors is the permanganate value (PV).

It is understood that the lactam obtained by the process described above is to be further refined, either by distillation or by extraction. The process above described also can be carried out continuously.

The invention now will be further explained by the following examples. However, it should be understood that these are given merely by way of illustration, not of limitation, and that numerous changes may be made in the details without departing from the spirit and the scope of the invention as hereinafter claimed.

EXAMPLE 1

500 ml. crude caprolactam of a pH of 8 were diluted with 200 ml. water and acidulated with 25 ml. n/1 $H_2SO_4$ so that the pH was lowered to 3.5. During the ensuing distillation of six equal fractions of 50 ml. each, the pH in the sump rose slightly, so that an additional 13.7 ml. n/1 $H_2SO_4$ had to be added to the sump in order to keep its content at a pH of 3.5. Thus the pH of 3.5 prevailed in the sump throughout the duration of the distillation.

The first 3 fractions of the aqueous distillate were acid, having pH values of 2.3 in the first fraction, 2.4 in the second fraction and 3.8 in the third. They contained 0.65 to 0.4 milliequivalent volatile acids, but no sulfate ions. This denoted that volatile acid impurities were removed from the lactam. Although the pH of the sump contents (or still bottoms) was retained at 3.5, as stated above, fractions 4, 5 and 6 of the distillate were alkaline, having pH values of 9.5–10.1.

The permanganate stability of each of the 6 fractions was tested, and the values obtained as listed in Table 2.

Table 2

| Fraction: | PV |
|---|---|
| 1 | 0 |
| 2 | 200 |
| 3 | 250 |
| 4 | 1500 |
| 5 | 3500 |
| 6 | 4000 |

(These permanganate values show clearly that impurities had been removed with the acid fractions which lower the permanganate stability of the caprolactam.)

The lactam oil remaining in the sump was rendered strongly alkaline by addition of NaOH and subjected to distillation. A first run consisted of basic impurities, water and a little caprolactam. The bulk of the caprolactam was distilled at 2–4 mm. Hg. 203 g. lactam distilled which had a permanganate value of 55–100.

When no sulfuric acid was added to the prerefining and otherwise the process carried out under identical conditions, the resulting lactam had a permanganate value of only 5.

EXAMPLE 2

990 liters per hour of the same crude product as used in Example 1 were freed within 15 days from volatiles with 400 l. water per hour in a circulation evaporator with addition of sulfuric acid (10%) at a pH of 3.5–3.8. The evaporator operated at 270–300 mm. Hg absolute and at a sump temperature of 80° C. 470 l. distillate per hour were obtained. The distilling water had a pH of 2.0–6.0 and contained approximately 0.002 gram-equivalent volatile acids per liter. The caprolactum thus prerefined was continuously removed, extracted and distilled. The pure lactam then obtained had permanganate values of 1,200–2,000.

When no acid was added to the evaporator, the pure lactam obtained under otherwise identical conditions had permanganate values of only 300–400.

We claim as our invention:

1. A process for the purification of crude epsilon-caprolactam comprising the steps of diluting said crude epsilon-caprolcatam with water in the proportion of approximately 2 parts added water to 5 parts crude epsilon-caprolactam, acidulating the resultant crude to a pH range of 3.2 to 4.2 with an additive consisting essentially of sulfuric acid, subjecting the resultant mixture to distillation to vaporize the water contained in said crude caprolactam, and subjecting the resultant caprolactam to rectification.

2. A process for the purification of crude epsilon-caprolactam comprising the steps of diluting said crude epsilon-caprolactam with water in the proportions of approximately 2 parts added water to 5 parts crude caprolactam, acidulating the resultant crude to a pH range of 3.2 to 4.2 with an additive consisting essentially of sulfuric acid, subjecting the resultant mixture to distillation in a plurality of equal fractions to vaporize the water contained in said crude caprolactam while containing said pH range by adding additional acidulant, and subjecting the resultant caprolactum to rectification.

3. A process for the continuous purification of crude epsilon-caprolactam comprising the steps of continuously diluting said crude epsilon-caprolactum with water in proportions of approximately 2 parts added water to 5 parts crude caprolactam, acidulating the resultant crude to a pH range of 3.2 to 4.2 with an additive consisting essentially of sulfuric acid and continuously maintaining said pH range, continuously subjecting the resultant mixture to distillation to vaporize the water contained in said crude caprolactam, the latter having a dwelling time in the distillation of less than 30 minutes, continuously drawing off caprolactam from the distillation and rectifying the same.

References Cited by the Examiner
UNITED STATES PATENTS

| 2,605,261 | 7/1952 | Kahr | 260—239.3 |
| 2,752,336 | 6/1956 | Boon et al. | 260—239.3 |
| 2,939,865 | 6/1960 | Fueg et al. | 260—239.3 |
| 2,993,889 | 7/1961 | Muytjens et al. | 260—239.3 |
| 3,016,375 | 1/1962 | Hopkins et al. | 260—239.3 |
| 3,016,376 | 1/1962 | Francis | 260—239.3 |

NORMAN YUDKOFF, *Primary Examiner.*